(12) United States Patent
Schelling et al.

(10) Patent No.: US 6,694,418 B2
(45) Date of Patent: Feb. 17, 2004

(54) MEMORY HOLE MODIFICATION AND MIXED TECHNIQUE ARRANGEMENTS FOR MAXIMIZING CACHEABLE MEMORY SPACE

(75) Inventors: Todd A. Schelling, Irmo, SC (US); Ronald P. Meyers, Jr., Portland, OR (US)

(73) Assignee: Intel Corporation, Santa Clara, CA (US)

(*) Notice: Subject to any disclaimer, the term of this patent is extended or adjusted under 35 U.S.C. 154(b) by 265 days.

(21) Appl. No.: 09/821,113

(22) Filed: Mar. 30, 2001

(65) Prior Publication Data

US 2002/0188803 A1 Dec. 12, 2002

(51) Int. Cl.[7] ............................................. G06F 12/08
(52) U.S. Cl. ..................... 711/171; 711/118; 711/138; 711/170
(58) Field of Search ................................. 711/118, 138, 711/139, 170, 172, 173, 171

(56) References Cited

U.S. PATENT DOCUMENTS

| | | | | |
|---|---|---|---|---|
| 5,946,713 A | * | 8/1999 | Hacking et al. | 711/170 |
| 6,134,641 A | * | 10/2000 | Anand | 711/202 |
| 6,363,473 B1 | * | 3/2002 | Volentine et al. | 712/202 |
| 6,408,384 B1 | * | 6/2002 | Adams | 712/227 |

* cited by examiner

*Primary Examiner*—Gary Portka
(74) *Attorney, Agent, or Firm*—Rob D. Anderson

(57) ABSTRACT

Cache defining arrangements for maximizing cacheable memory space, including a mixed technique scheme using a bottom-up scheme defining a first non-memory-hole portion using mainly substantially additive blocks of cacheable space, and a top-down scheme defining a second non-memory-hole portion by defining an oversized block of cacheable space and using mainly substantially subtractive blocks of cacheable space.

45 Claims, 9 Drawing Sheets

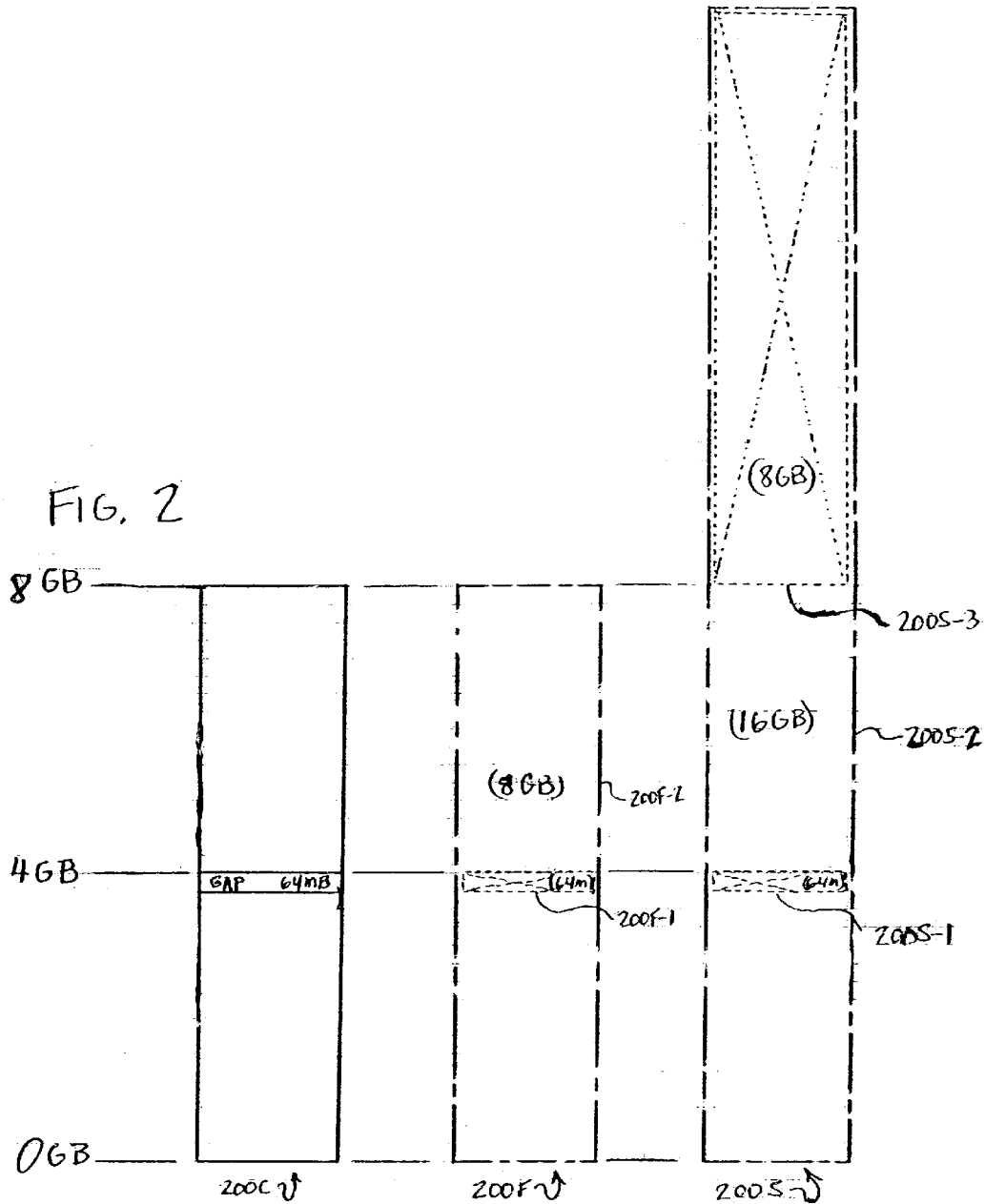

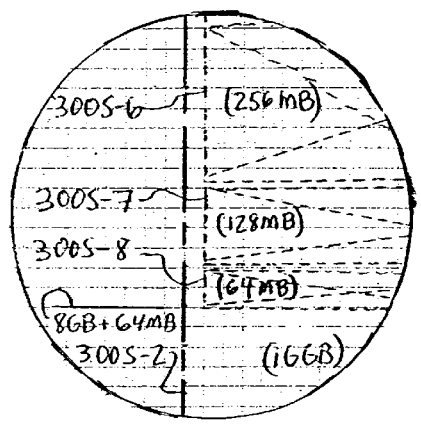
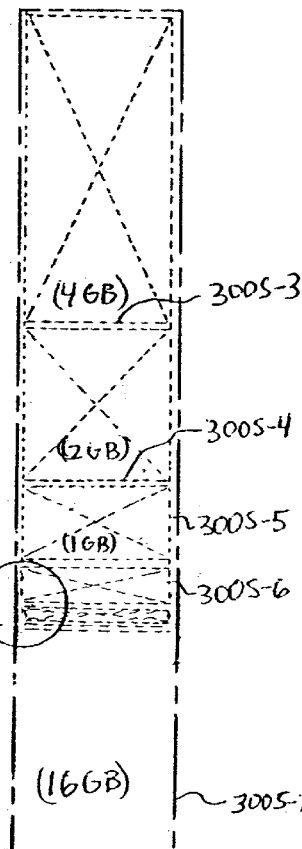
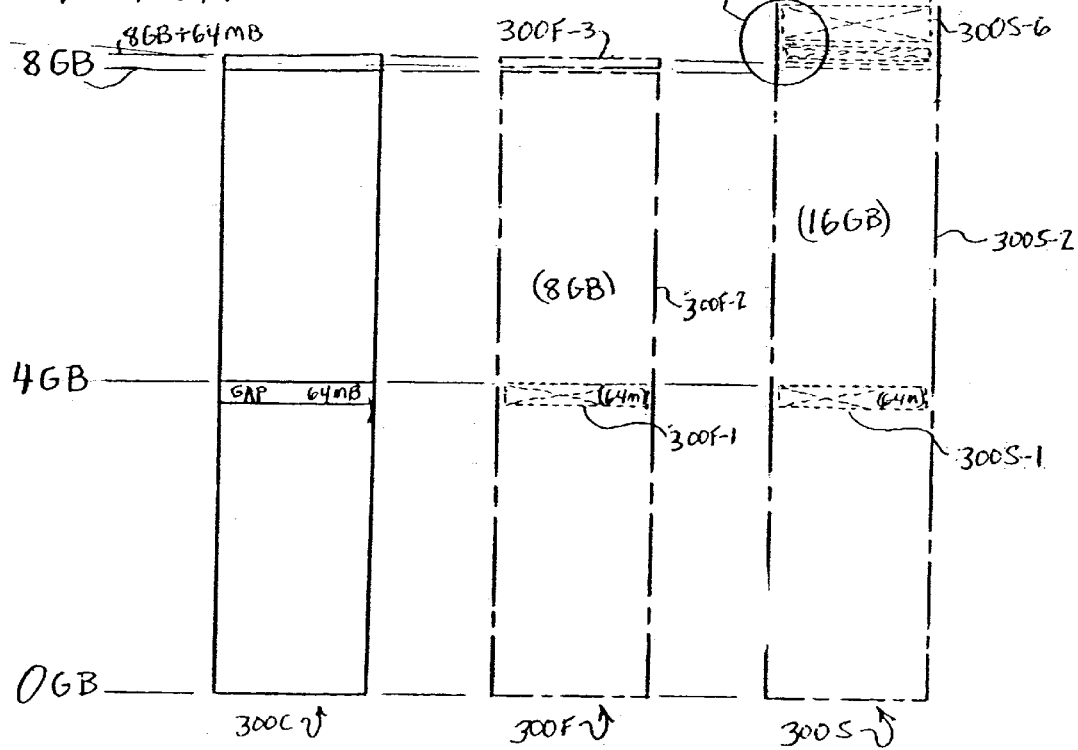

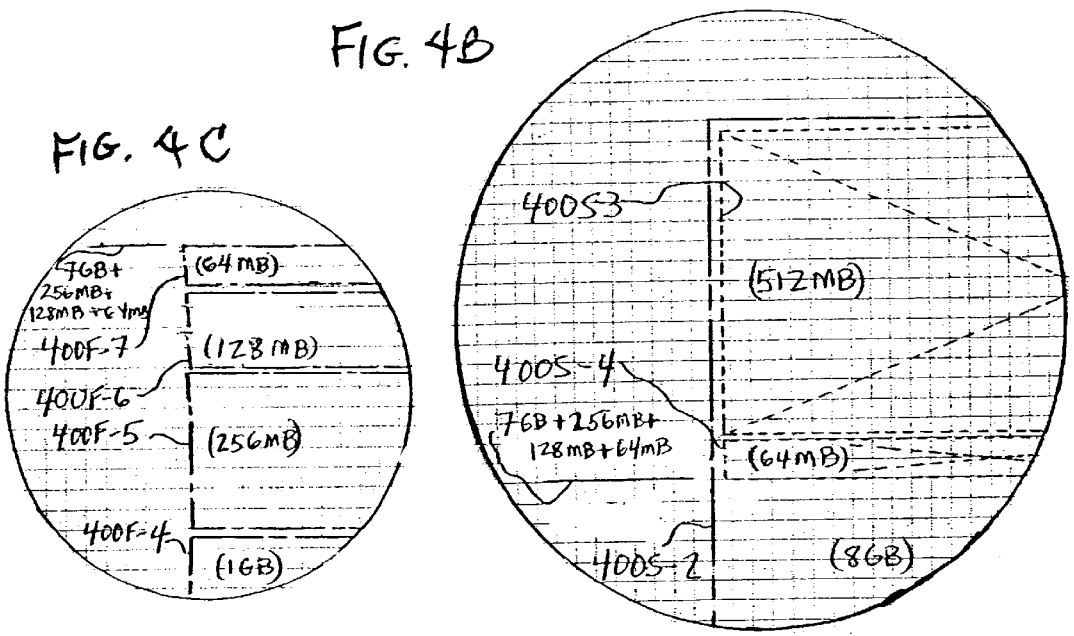
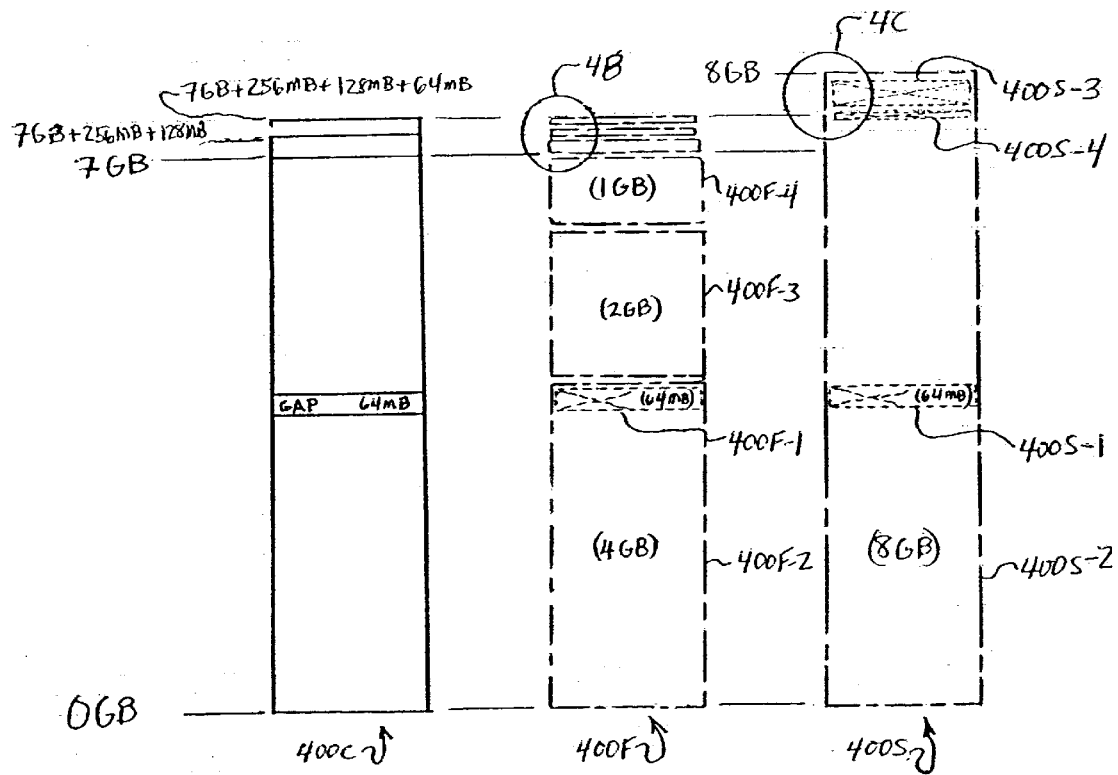

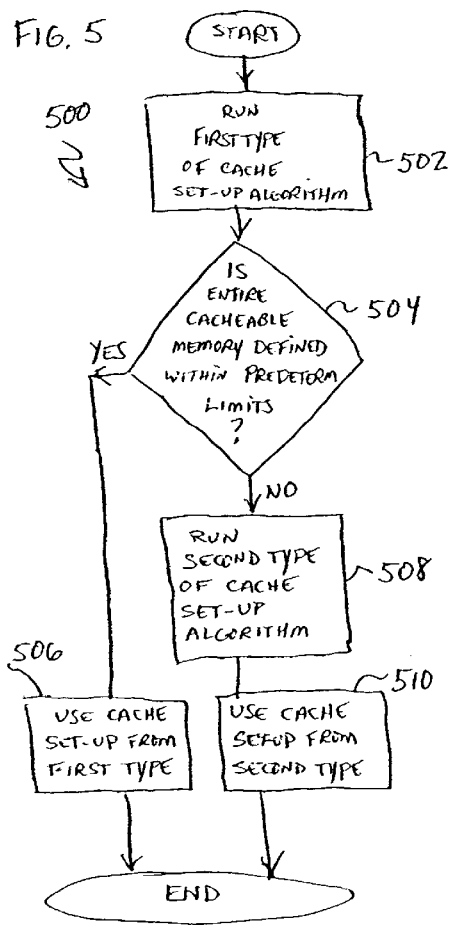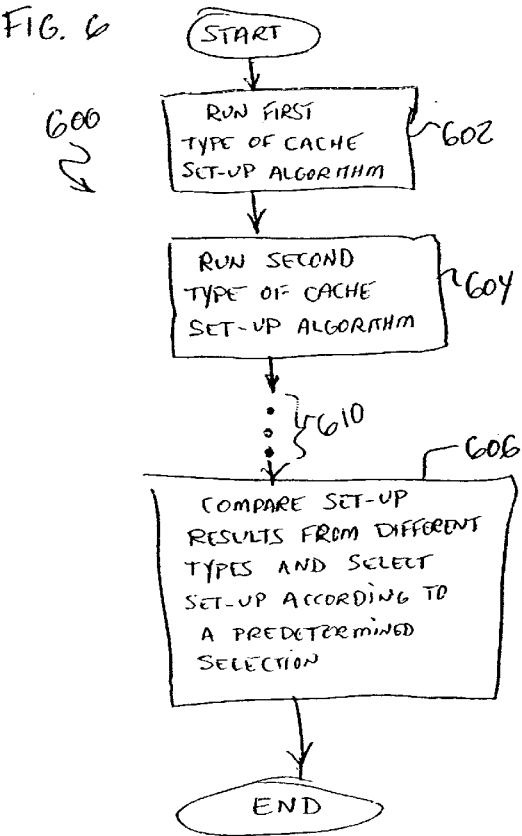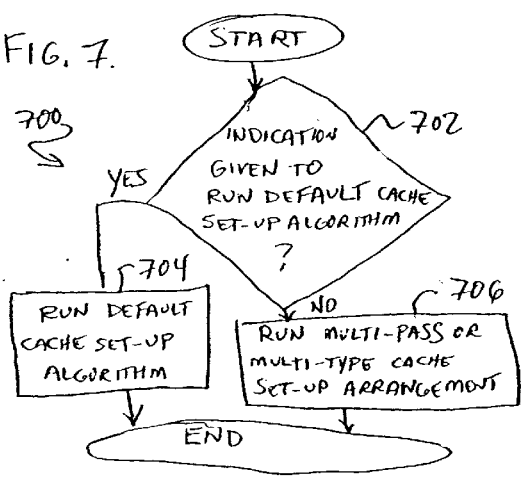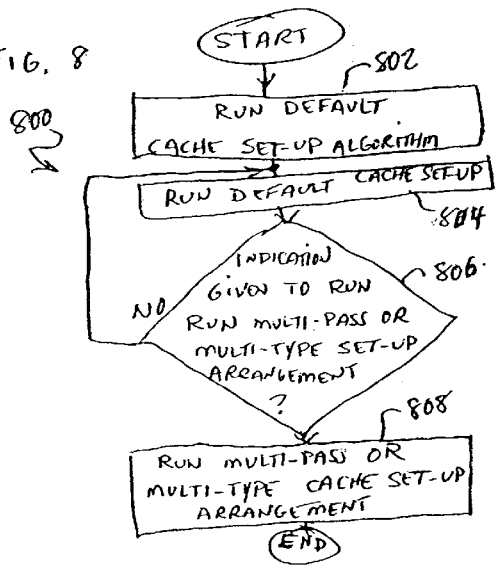

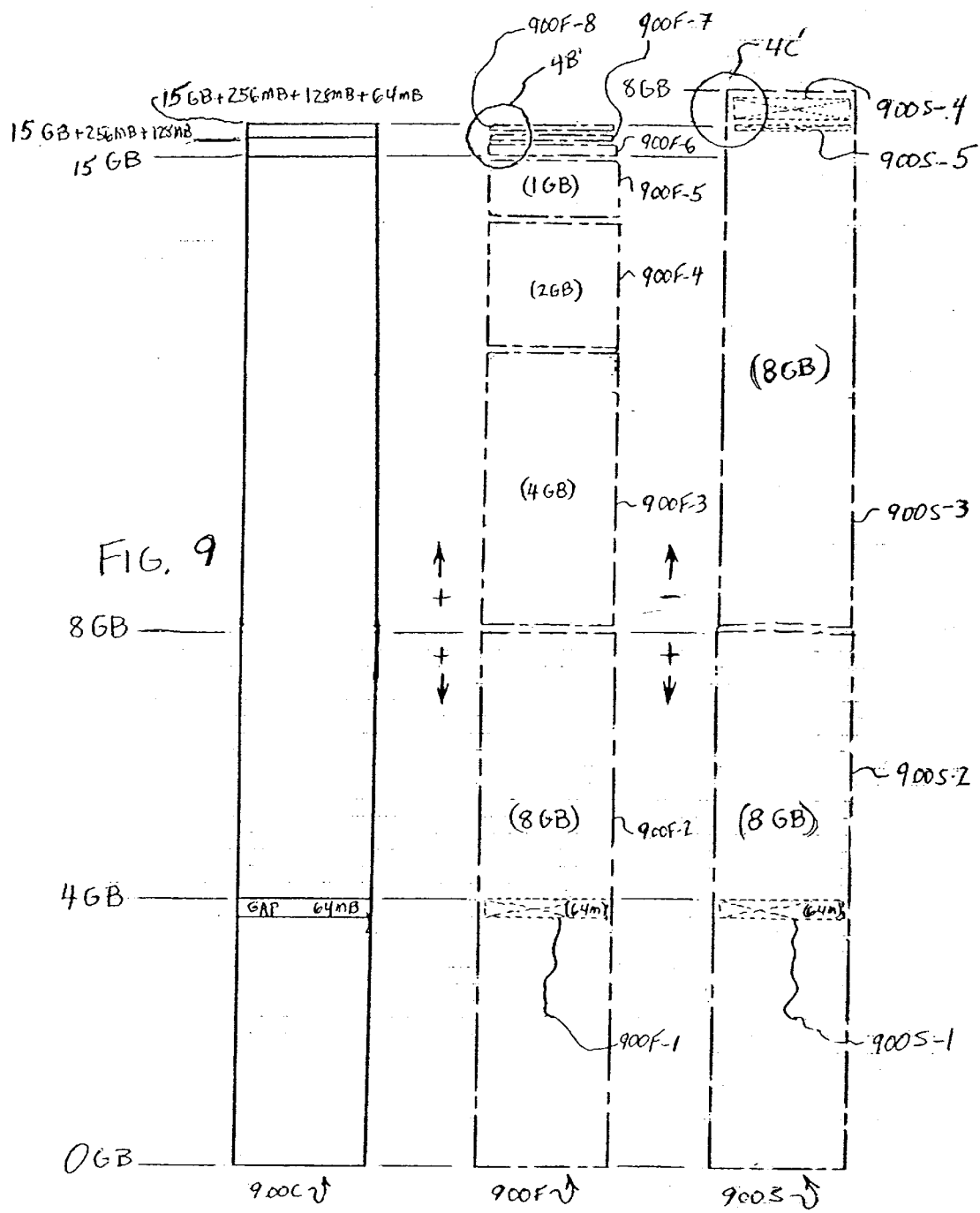

MEMORY HOLE MODIFICATION AND MIXED TECHNIQUE ARRANGEMENTS FOR MAXIMIZING CACHEABLE MEMORY SPACE

CROSS-REFERENCE TO OTHER APPLICATIONS

This application is cross-referenced to U.S. patent application Ser. No. 09/608,182, filed Jun. 30, 2000, still pending.

FIELD

The present invention is directed to efficient defining of cacheable memory space. More particularly, the present invention is directed to memory hole modification and mixed technique arrangements for maximizing cacheable memory space.

BACKGROUND

The computer industry's devotion, commitment and adherence to support long existing BIOS (basic input/output system) functions have advantageously helped fuel the wide-spread (i.e., global) acceptance of computers and the explosion of the computer industries. However, such commitment and adherence have likewise been found to result in disadvantages as follows.

More particularly, BIOS has historically been embodied as an assembly language (i.e., machine code) program which is first loaded (even before the operating system (OS)) when a computer is started, and which provides the most basic, low-level, intimate control and supervision operations for the computer. More specifically, BIOS performs functions such as: POST (power-on/self-test); acting as an intermediary between different hardware; setting up (i.e., defining) cacheable memory space, finding/loading the OS (operating system), etc.

With regard to setting up (i.e., initializing) of a system, typically within processor systems, a portion of memory will be set aside (i.e., reserved) for use as cacheable memory space to serve as a fast internal cache memory for the purposes of "caching" slower physical memory in the system in an overall effort to increase the system's performance. The size of the portion of memory set aside for cacheable memory space may vary greatly from system to system, e.g., the cacheable memory space may be 64 MB (i.e., mega-byte), 106 MB, 3.5 GB (i.e., giga-byte), etc. It is extremely advantageous that a size of defined cacheable memory space be maximized, as such will typically lead to increased (i.e., faster) system performance.

Historically, BIOS programming has been embodied in a singular or small number of monolithic blocks of intertwined assembly or machine code, such monolithic nature being illustrated by the singular dashed block 11 drawn around all of FIG. 1 BIOS functions. Intertwining often meant that changes were very difficult to make, as changes in one portion of the code often affected the operation of remaining portions of the code. Accordingly, BIOS code is disadvantageously very difficult to write, debug and/or change. In view of BIOS' difficult assembly language programming and debugging, hardware companies typically have relied upon BIOS specialist companies (e.g., American Megatrends Inc. (AMI), Award Software, Microid Research (MR), Phoenix Technologies Ltd.) to provide BIOS code.

The desire for adherence to long existing BIOS code and the complexity of BIOS have sometimes resulted in complacency in the industry, resulting in minimal or no advances in some of the BIOS functions. The BIOS function of setting up (i.e., defining) of cacheable memory space is one function in need of improvement.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 2 includes an example block diagram of a first example cacheable memory block useful in explanation of the invention, as well as additional block diagrams showing definition treatment of the memory block;

FIG. 3A includes an example block diagram of another example cacheable memory block useful in explanation of the invention, as well as additional block diagrams showing definition treatment of the memory block, whereas FIG. 3B shows a magnified view of a portion of FIG. 3A;

FIG. 4A includes an example block diagram of another example cacheable memory block useful in explanation of the invention, as well as additional block diagrams showing definition treatment of the memory block, whereas FIGS. 4B and 4C show magnified views of portions of FIG. 4A;

FIGS. 5–8 are example flow diagrams showing operations with respect to example embodiments of the invention;

FIG. 9 includes an example block diagram of another example cacheable memory block useful in explanation of the invention, as well as additional block diagrams showing definition treatment of the memory block;

DETAILED DESCRIPTION

Figure 1:
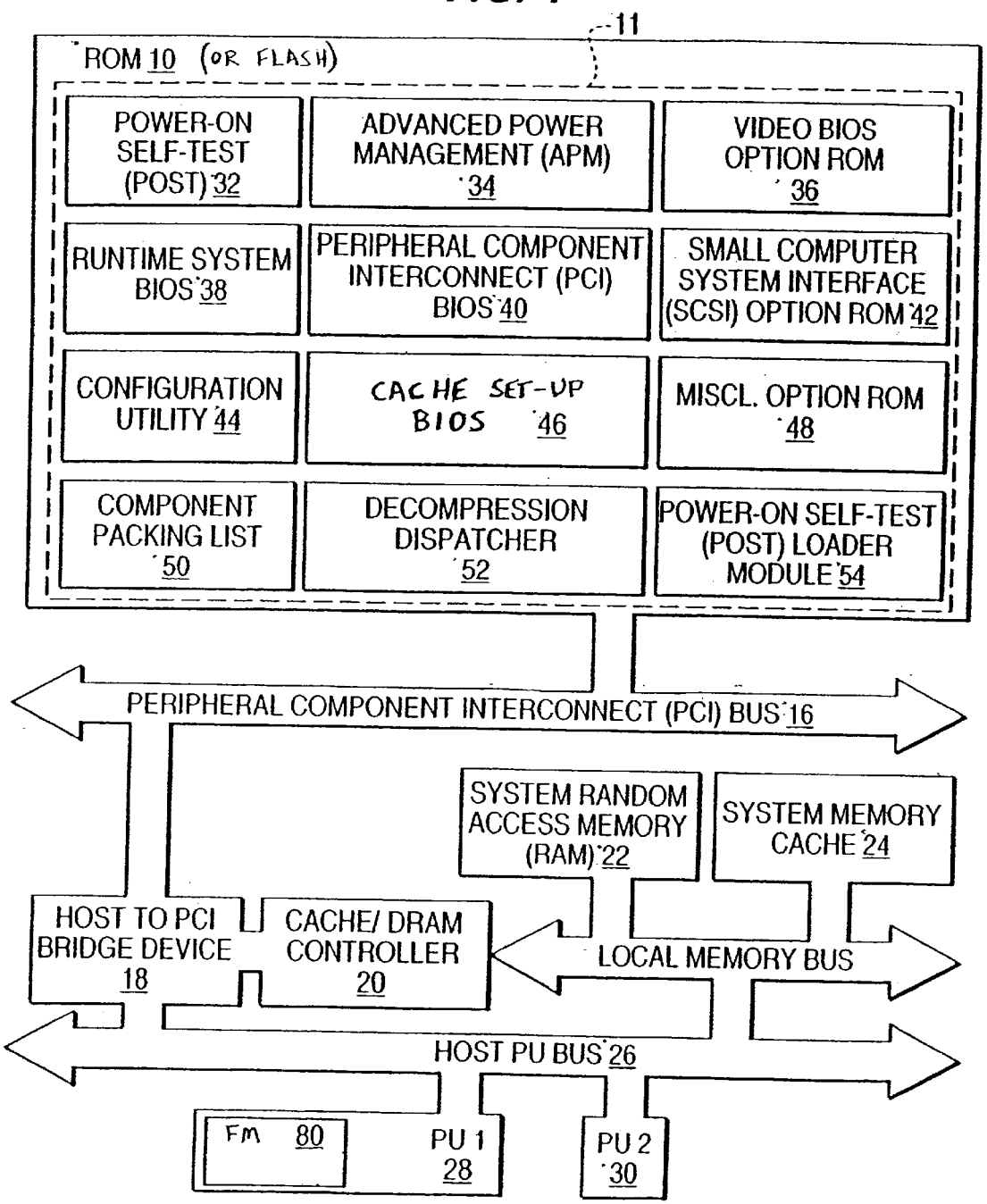
FIG. 1 is block diagram of an example system having an example firmware arrangement useful in explanation of the present invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited thereto. Still further, cache memory blocks are not drawn to scale, and instead, example values are mentioned when appropriate. As a further note, well known power/ground connections to ICs and other components may not be shown within the FIGS. for simplicity of illustration and discussion, and so as not to obscure the invention.

Although example embodiments of the present invention will be described using an example system block diagram in an example personal computer (PC) environment, practice of the invention is not limited thereto, i.e., the invention may be able to be practiced with other types of systems, and in other types of environments (e.g., servers, personal digital assistants (PDAS), computer gaming systems). Further, while example embodiments will be described using Memory Type Range Registers (MTRRS) and systems with P6 family processors (of Intel Corporation), practice of the invention is not limited thereto, i.e., the invention may be able to be practiced with other types of registers or cache defining arrangements, and in other types of processor environments.

Discussion turns first to FIG. 1, which is a block diagram of an example system having an example disadvantageous firmware arrangement. More particularly, the FIG. 1 example arrangement includes a Read-Only Memory ROM 10 (which may be FLASH memory), a Dynamic Random Access Memory DRAM 22, a System Memory Cache 24, a Cache/DRAM Controller 20, and a plurality of Processor Units (PU) 28, 30, all provided along a Host Processor Unit (PU) Bus 26 and Local Memory Bus. The ROM 10 is connected to a Peripheral Component Interconnect (PCI) bus 16 (e.g., PCI Local Bus Specification Product Version, revision 2.1, published Jun. 1, 1995). A Host-to-PCI Bridge Device 18 bridges the PCI bus 16 and the Host PU Bus 26.

The BIOS may be encoded in ROM 10, and may contain a number of BIOS functions, e.g., a non-exhaustive listing including: power-on self-test (POST) 32; advanced power management (APM) 34; Video BIOS option 36; runtime system BIOS 38; Peripheral Component Interconnect (PCI) BIOS 40; small computer system interface (SCSI) option 42; configuration utility 44; cache set-up BIOS 46; miscellaneous options 48; component packing list 50; decompression dispatcher 52; and POST loader module 54.

On P6 family processors, as one example useful in describing the invention, in order for physical memory to be cacheable, it must be described (i.e., reserved) using a fixed (i.e., predetermined) number of internal processor registers called Memory Type Range Registers (MTRRS). These registers also must be carefully programmed so that other address space in a computer system that should not be cached is not accidentally described as cacheable (otherwise system crashing and/or data corruption may occur). Further, with respect to a block of memory available for cache memory, for efficiency purposes, all or a maximum amount of physical memory within that block should be defined within the MTRRS as being cacheable, because any physical memory that is not cacheable represents unavailable/unused resources which has the potential to slow the performance of the overall system. That is, a smaller cacheable memory space will require the system to perform recycling (i.e., reuse) functions with respect to the cacheable memory more often, thereby inefficiently using up system bandwidth for cache recycling, which bandwidth could otherwise be used for processing performance. Therefore, in order to maximize system performance, these registers must be programmed to maximize the cacheable physical memory space without describing more space than the amount of actual physical memory. Due to the granularity constraints of these registers and the design constraints of compatible Intel Architecture computer systems, the establishment of a software algorithm to initialize these registers for all possible physical memory configurations supportable by a given hardware system may be a difficult task. The present invention introduces arrangements that attempt to improve the MTRR definition tasks.

As mentioned previously, typically, BIOS software configures the MTRRS. In one example BIOS (i.e., OCPRF100 BIOS from Phoenix Technologies), the BIOS sets the MTRRS after PCI resources have been assigned and system memory has been tested. The BIOS uses the fixed range MTRRS to describe regions below 1 MB, and variable range MTRRS to describe the rest of memory space. The example processor contains eight variable range MTRRS, of which two (i.e., according to predetermined operating rules) must be left free for use by the operating system. Thus, BIOS can use only six variable range MTRRS to define the cacheable memory space. The processor permits MTRR ranges to overlap in specific cases. If a fixed range MTRR and a variable range MTRR refer to the same region of memory, the processor honors the fixed range MTRR. If two variable range MTRRS overlap, uncacheable (UC) and write protect (WP) supercede writeback cacheable (WB) memory space. Other types of overlap may produce undocumented or unexpected results.

Use of MTRRS may further have predetermined range size and alignment requirements. A minimum range size for an MTRR may be 4 KB (i.e., kilo-bytes), for example, and a base address of this range may have to be on a 4 KB boundary. For ranges greater that 4 KB, each defining MTRR range may have to be of a length $2^n$ and its base address may have to be aligned on a $2^n$ boundary, where n is a value equal to or greater than 12. As a still further example predetermined requirement, the base address alignment value may not be less than its length. For example, an 8 KB range may not be aligned on a 4 KB boundary, i.e., it may have to be aligned on at least an 8 KB boundary. Additionally, the length of a region of memory described by a variable range MTRR may have to be a power of two. Further, the region may have to start on a boundary that is a multiple of its length.

For example, a single register may describe a 4 MB block but not a 6 MB block. That 4 MB block can start at 104 MB or 108 MB, but not 106 MB. Other sizes require multiple MTRRS. For example, to describe a 3.5 GB system, BIOS programs a 2 GB block, a 1 GB block, and a 512 MB block. Such a configuration consumes three MTRRS. For further teachings regarding MTRRS and cache memory, attention is directed to pages 9–17 to 9–31 from the *Intel Architecture Software Developer's Manual, Volume 3 System Programming Guide*, 1997.

In addition to the above discussions, for IA-32 architecture systems with large amounts of physical memory (~4 GB and larger), it is necessary to describe a Memory Hole below the GB address boundary. This is required for the BIOS FLASH memory part, the PC Address Space, IOAPIC, PCI Hot Plug padding, etc. An initial size of the Memory Hole is calculated by the BIOS prior to the defining of the MTRRS. Treatment of Memory Hole size will be shown later to be one important feature of the present invention, but such discussion will be delayed until an appropriate portion of the disclosure ahead. The cache set-up function of a Phoenix™ Technologies BIOS software has been previously studied with respect to the existing algorithm for programming MTRRS. It can be described as a bottom-up approach starting at address 0 and working towards the top of memory by powers of 2, until all available variable MTRRS (i.e., six MTRRS in the present example) are exhausted in attempting to define the cache memory block size. Any remaining memory is left undefined and therefore UC. The following pseudo-code attempts to describe the Phoenix algorithm:

```
OldProgramMTRRS (takes top of memory and any gaps below top of memory as in puts);
    Var Index, CurrentBaseAddress, CurrentUndescribedMemory, CurrentBlockSize
        Index 1
        if (Gap != 0) Then
            MTRR(Index) BaseAddress := (Gap base address)
            MTRR(Index) Size := (Gap size)
            Index:= Index + 1
        Endif
        CurrentBaseAddress := 0
        CurrentUndescribedMemory := (top of memory)
        Repeat
            CurrentBlockSize:= FindLargestBlock(CurrentUndescribedMemory)
                    //The FindLargestBlock routine determines the largest power
                    //of 2 that is <= CurrentUndescribedMemory
            MTRR(Index) BaseAddress := CurrentBaseAddress
            MTRR(Index) Size := CurrentBlockSize
            Index := Index + 1
            CurrentBaseAddress := CurrentBaseAddress + CurrentBlockSize
            CurrentUndescribedMemory := CurrentUndescribedMemory - CurrentBlockSize
        Until ((Index >=7) OR (CurrentUndescribedMemory = 0))
        return
EndOldProgramMTRRS.
```

FIG. 2 illustrates an example 8 GB (giga-byte) block 200C of physical memory (having a 64 MB (mega-byte) memory hole or gap therein) which may exist within a system, and which is available for definition as cacheable memory space. A center portion 200F of FIG. 2 illustrates how, using the above algorithm, the MTRRS are used to define the cacheable memory space with respect to the physical memory. Within FIG. 2 and similar FIGS., short-dashed-line blocks with an "X" therein (e.g., 200F-1) will be used to illustrate uncacheable (UC) and write protect (WP) memory space, whereas long-/short-dashed-line blocks (e.g., 200F-2) will be used to illustrate writeback cacheable (WB) memory space. Again, with any overlap, UC and WP supercede WB memory space. Further, within FIG. 2 and similar FIGS., a byte size of dashed-line blocks will be illustrated within parentheses (e.g., "(8 GB)") for ease in understanding.

Returning to discussion of the FIG. 2 center portion 200F, a first MTRR is used to define the 64 MB memory hole as illustrated by the short-dashed-line block 200F-1, and a second MTRR is used to define the overall 8 GB block as illustrated by the long-/short-dashed-line block 200F-2. That is, an additive method describes memory by starting with the largest modulo 2 number that does not exceed the physical memory installed in the system. It then finds the largest modulo 2 number that does not exceed the remaining undescribed memory. The algorithm continues until either all memory has been described or until all MTRRS have been used, which ever comes first. Accordingly, using the above algorithm for the FIG. 2 simplistic example, two MTRRS are used to define the 8 GB memory space 200C. Therefore, it can be seen that in the FIG. 2 example, the above algorithm would define cacheable memory space efficiently and completely.

MTRR programming becomes more complicated when system memory grows large enough to overlap PCI resources. PCI resources cannot be allowed to be cacheable. The BIOS programs MTRRS that describe system memory plus an additional MTRR that describes the overlap. Due to a Memory Reclaiming feature supported by some hardware, the top of memory may be adjusted to account for the remapped memory. For example, FIGS. 3A–3B illustrate an example system with 8 GB of memory and a 64 MB High Memory Gap (HMG).

More particularly, FIG. 3A shows the effect of reclaiming on the system memory map. In this example, the system contains 8 GB of memory with a 64 MB gap just below 4 GB. Beginning at the gap, the BIOS shifts the physical mapping upward by the size of the gap. The top of system memory is shifted upward by the size of the gap. Due to reclaiming, the top of memory in this FIG. 3A example is thus not the same as the FIG. 1 8 GB top of memory, but instead is 8 GB+64 MB as illustrated by the physical memory block 300C. For such a system, the BIOS (using the algorithm described by OldProgramMTRRS) programs the MTRRS as follows:

One MTRR describes a 64 MB HMG from 0_FC00_0000h to 0_FFFF_FFFFh as UC. This range takes precedence over any WB range that it overlaps.

One MTRR describes an 8 GB block of system memory from 0_0000_0000h to 1_FFFF_FFFFh as WB. Note that the fixed range MTRRS take precedence in the lower 1 MB of this region.

One MTRR describes a 64 MB block of system memory from 2_0000_0000h to 2_03F0_0000h as WB.

Accordingly, directing attention to a center portion 300F of FIG. 3A, a first MTRR is used to define the 64 MB gap as illustrated by the short-dashed-line block 300F-1, a second MTRR is used to define the 8 GB block as illustrated by the long-/short-dashed-line block 300F-2, and a third MTRR is used to define the 64 MB+ block as illustrated by the long-/short-dashed-line block 300F-3. Accordingly, using the above algorithm, three MTRRS are used to define the 8 GB+64 MB memory space 300C. Again, in the FIG. 3 example, the above algorithm would define cacheable memory space efficiently and completely.

Some hardware platforms are capable of supporting memory configurations that cannot be completely described using the algorithm given above. Consider, for example, a system with 7 GB and 384 MB of system memory and a 64 MB HMG, as illustrated within FIG. 4A as cacheable memory block 400C. After reclaiming the gap, the top of memory becomes 7 GB and 448 MB. By the original method, it would take one MTRR to describe the gap and six MTRRS to describe system memory (4 GB+2 GB+1 GB+256 MB+128 MB+64 MB). More particularly, attention is directed to the center portion 400F as well as magnified view FIG. 4B (i.e., magnified view of FIG. 4A's encircled area 4B), for illustration of the seven (7) MTRR "blocks", i.e., 400F-1, 400F-2, 400F-3, 400F-4, 400F-5, 400F-6 and 400F-7.

Since BIOS is not allowed to use more than six MTRRS, the last 64 MB range in the example (i.e., MTRR "block" 400F-7) would have to be left uncacheable. This could negatively impact the performance of the system if it happened to try to use any of the uncacheable memory. The present invention provides an advantageous solution with a multi-pass capable algorithm.

More particularly, the multi-pass starts using an example single pass (i.e., first type of) method in an attempt to describe the physical memory. If this method (e.g., the example of FIG. 4A) consumes more MTRRS than the six that BIOS is allowed to use, the multi-pass BIOS uses an alternate (e.g., second pass or second type of) method in an attempt to alternatively define cacheable memory using a smaller number of MTRRS. The above-described first pass or first type of algorithm, i.e., the OldProgramMTRRS program, can be looked at essentially as a bottom-up or additive-type algorithm in that (except for definition of the gap) the largest "block" which fits within the available cacheable memory space is defined using an MTRR, and then progressively smaller additional "blocks" are then progressively defined using subsequent MTRRS and cumulatively added until useable MTRRS are depleted. Any remaining memory is left as undescribed/uncacheable.

In contrast, the example second pass or second type of algorithm of the present invention can be looked at essentially as a top-down or subtractive-type algorithm in that the largest "block" which fits within the available cacheable memory space and then multiplied by two (2) is defined using an MTRR, and then progressively smaller "blocks" progressively defined using subsequent MTRRS are subtracted therefrom (i.e., defined as UC) until useable MTRRS are depleted. That is, in the alternate method, the BIOS uses one MTRR to describe a block that is larger than the actual amount of cacheable memory, and then uses remaining MTRRS to trim away UC addresses. The following pseudo-code describes an example multi-pass or two-type capable algorithm:

```
NewProgramMTRRS (takes top of memory and any gaps below top of memory as inputs);
Var Index, CurrentBaseAddress, CurrentUndescribedMemory, CurrentBlockSize, PassCount
    Index = 1
    If (Gap != 0) Then
        MTRR(Index) BaseAddress := (Gap base address)
        MTRR(Index) Size := (Gap size)
        Index := Index + 1
    EndIf
    PassCount := 1;
    // First try the bottom-up approach
Bottom UpApproach::
    CurrentBaseAddress := 0;
    CurrentUndescribedMemory := (top of memory)
    Repeat
        CurrentBlockSize := FindLargestBlock(CurrentUndescribedMemory)
        MTRR(Index) BaseAddress := CurrentBaseAddress
        MTRR(Index) Size := CurrentBlockSize
        Index := Index + 1
        CurrentBaseAddress := CurrentBaseAddress + CurrentBlockSize
        CurrentUndescribedMemory := CurrentUndescribedMemory - CurrentBlockSize
    Until ((Index ≥7) OR (CurrentUndescribedMemory = 0));
    If (CurrentUndescribedMemory = 0) Then GOTO Exit
    If PassCount = 2 Then GOTO Exit
    //Second try the top-down approach
    CurrentUndescribedMemory = (top of memory)
    CurrentBlockSize := FindLargestBlock(CurrentUndescribedMemory)
    CurrentBlockSize := CurrentBlockSize *2
    MTRR(Index) BaseAddress := 0
    MTRR(Index) Size := CurrentBlockSize
    Index := Index + 1
    CurrentBaseAddress =: CurrentBlockSize
    CurrentUndescribedMemory = CurrentBlockSize - CurrentUndescribedMemory
    While ((Index ≤ 7) AND (CurrentUndescribedMemory != 0))
    {
        CurrentBlockSize := FindLargestBlockSize (CurrentUndescribedMemory)
        CurrentBaseAddress := CurrentBaseAddress - CurrentBlockSize
        MTRR(Index) BaseAddress := CurrentBaseAddress
        MTRR(Index) Size := CurrentBlockSize
        Index := Index + 1
        CurrentUndescribedMemory := CurrentUndescribedMemory - CurrentBlockSize
    }
    If (CurrentUndescribedMemory != 0) Then
        PassCount := 2
        GOTO Bottom UpApproach
    Endif
```

```
Exit:
    return
EndNewProgramMTRRS
```

Using this alternate algorithm, the FIG. 4A cacheable memory space 440C of 7 GB+256 MB+128 MB+64 MB can be defined, for example, using only four MTRRS of:

One MTRR describes a 64 MB HMG from 0_FC00_0000h to 0_FFFF_FFFFh as UC. This range takes precedence over the WB range it overlaps.

One MTRR describes an 8 GB block of system memory from 0_0000_0000h to 1_FFFF_FFFFh as WB. As before, the fixed range MTRRS take precedence in the lower 1 MB of this region.

One MTRR describes a 512 MB block of system address space from 1_E000_0000h to 1_FFFF_FFFFh as UC. This range takes precedence over the WB range it overlaps.

One MTRR describes a 64 MB block of system address space from 1_DC00_0000h to 1_DFFF_FFFFh as UC. This range takes precedence over the WB range it overlaps.

Accordingly, directing attention to a right-hand portion 400S of FIG. 4A, a first MTRR is used to define the 64 MB gap as illustrated by the short-dashed-line block 400S-1, a second MTRR is used to define a 8 GB block (i.e., two times the 4 GB (i.e., largest) block fitting within the cacheable memory space) as illustrated by the long-/short-dashed-line block 400S-2, a third MTRR is used to define a −512 MB block as illustrated by the long-/short-dashed-line block 400S-3 in FIG. 4A as well as magnified view FIG. 4C (i.e., magnified view of FIG. 4A's encircled area 4C), and a fourth MTRR is used to define a −64 MB block as illustrated by the long-/short-dashed-line block 400S-4. Accordingly, using second pass or second-type algorithm, four MTRRS may be used to define the 8 GB+256 MB+128 MB+64 MB memory space 400C. Note that with this 8 GB+256 MB+128 MB+64 MB example, the second pass or second-type algorithm gives better cacheable-memory-defining results over the first pass or first-type algorithm, in that only four MTRRS are required as opposed to the previous seven.

With regard to further discussion of the invention, it should be noted that the second pass or second-type algorithm (e.g., top-down approach) does not always give better cacheable-memory-defining results over the first pass or first-type algorithm (e.g., bottom-up approach). More particularly, directing attention first to a right-hand portion 200S of FIG. 2, note that three MTRRS (as illustrated by blocks 200S-1, 200S-2 and 200S-3) are required using the second pass or second-type algorithm, which is not an improvement over the first pass or first-type algorithm which only required two MTRRS (i.e., as illustrated by blocks 200F-1 and 200F-2). However, note that either algorithm could be validly used, as the requirement of not using more that six MTRRS has not been violated in either case.

The FIG. 3A example might be a more interesting example showing that the second pass or second-type algorithm does not always give better cacheable-memory-defining results over the first pass or first-type algorithm. More particularly, directing attention first to a right-hand portion 300S of FIG. 3A as well as magnified view FIG. 3B (i.e., magnified view of FIG. 3A's encircled area 3B), note that eight MTRRS (as illustrated by blocks 300S-1, 300S-2, 200S-3, 300S-4, 300S-5, 300S-6, 300S-7 and 300S-8) are required using the second pass or second-type algorithm, which is not an improvement over the first pass or first-type algorithm which only required three MTRRS (i.e., as illustrated by blocks 300F-1, 300F-2 and 200F-3). Note that the second pass or second type algorithm would be disadvantageous to use, in that once six MTRRS were depleted, the cacheable memory space still would not be properly/completely defined leading to system inefficiency, and disadvantageous results (e.g., system crashes or errors) could occur.

The example dual pass method attempts to properly describe all possible configurations using the supported DIMM sizes on OCPRF100 memory carriers with any combination of PCI cards. However, it should be noted that memory failures can create situations where small blocks cannot be described properly as cacheable memory. This occurs because the granularity of the OCPRF100 Extended Memory Test is 1 MB. Describing memory to this level of granularity can consume more MTRRS than are available. The small amount of leftover memory is left UC.

Because the above arrangement is an enhancement, any product that takes this code is certain to configure MTRRS at least as well as the previous arrangement, regardless of the given memory configuration. The real value of this arrangement is that it enables systems to have higher performance in certain memory configurations than otherwise possible.

The above-described cache set-up arrangement runs a second or differing type of cache set-up algorithm only if a first type of cache set-up algorithm is not able to define the entire cacheable memory within predetermined limits, e.g., using a predetermined number of MTRRS. More particularly, attention is directed to FIG. 5 which generically illustrates such arrangement in block-diagram flow form as flow 500. After Start, in block 502, a first type of cache set-up algorithm is run. In block 504, it is determined whether the entire cacheable memory is defined within predetermined limits. If yes, the second type of cache set-up algorithm is never run, and instead, as indicated in block 506, the cache set-up from the first type is used. If instead, block 504 determines that the entire cacheable memory is not defined within predetermined limits, the second type of cache set-up algorithm is run in block 508, and the cache set-up from the second type is used as indicated in block 510.

The above examples show practice of embodiments of the invention where an additive or subtractive method is applied substantially to the entire cacheable memory space with a given pass. However, practice of the present invention is not limited thereto, and FIG. 8 is illustrative of an example showing that it may be advantageous to apply additive and subtractive methods to different portions of the cacheable memory for a respective pass. Such approach can be termed "applying a mixed technique" for a given pass. More particularly, FIG. 9 illustrates an example 15 GB+256 MB+128 MB+64 MB block 900C of physical memory (having a 64 MB memory hole or gap therein) which may exist within a system, and which is available for definition as cacheable memory space. In the FIG. 9 example, the physical memory will be conceptually divided at an 8 GB location such that additive or subtractive MTRR methods can be selectively applied to the two memory "halves." Describing a FIG. 9 center portion first, which may be useful for later comparison purposes, such portion 900F illustrates how an additive approach applied to MTRR definition can be used to define a cacheable memory space with respect to the physical memory. More particularly, in a lower 0 GB–8 GB range, a first MTRR is used to define the 64 MB memory hole as illustrated by the short-dashed block 900F-1, and a second MTRR is used to define the overall 8 GB block as illustrated by the long-/short-dashed-line block 900F-2. Accordingly, using the additive method, two MTRRS are used to define the lower 0 GB–8 GB memory space range.

Turning now to the upper 8 GB+memory space, an additive method is again selectively applied. Thus, a third MTRR is used to define a 4 GB block as illustrated by the long-/short-dashed-line block 900F-3, and likewise, four through eight MTRRS would be needed to define 2 GB, 1 GB, 256 MB, 128 MB and 64 MB blocks, as illustrated by blocks 900F-4, 900F-5, 900F-6, 900F-7 and 900F-8, respectively. Because the blocks 900F-6, 900F-7 and 900F-8 are very similar to the blocks 400F-5, 400F-6 and 400F-7, respectively, as illustrated in the previously-discussed FIG. 4B, such blocks have been shown encircled having the designation 4B' to reference the similarity.

In retrospection, by applying the additive method to both the lower 0 GB–8 GB and upper 8 GB+ranges, it can be seen that an excessive number of eight MTRRS would be necessary to totally define the physical memory space. However, because in this example situation, only six MTRRS are available, cacheable memory space would be defined only up to block 900F-6, i.e., blocks 900F-7 and 900F-8 would not be defined as cacheable, thereby not optimizing defined cacheable memory space and degrading system performance.

Several additional notes are relevant with respect to conceptually dividing physical memory and applying mixed techniques. First, memory does not have to be conceptually divided into "halves" or even just two ranges, i.e, size divisions or number divisions may be applied as it practical. Second, an additive technique does not always have to be applied to the lower range, i.e., additive or subtractive techniques can be freely applied to any division.

Turning next to the right-hand portion 900S of FIG. 9, an additive approach is again applied to the lower 0 GB–8 GB memory range, to result in use of two MTRRS to define the blocks 900S-1 and 900S-2 in a similar manner as was discussed for the center portion 900F. In contrast to the 900F center portion, a subtractive method is now applied to the upper 8 GB+memory region of 900S. More particularly, a first MTRR is used to define an 8 GB block (i.e., two times the 4 GB (i.e., largest) block fitting within the 8 GB+cacheable memory space), as illustrated by the long-/short-dashed-line block 900S-3. Then, a fourth MTRR is used to define a –512 MB block as illustrated by the long-/short-dashed-line block 900S-4, and finally, a fifth MTRR is used to define a –64 MB block as illustrated by the long-/short-dashed-line block 900S-5. Again, because the blocks 900S-4 and 900S-5 are similar to the previously-discussed FIG. 4C 400S-3 and 400S-4 blocks, respectively, such blocks are illustrated as being encircled having a designation numeral 4C' to reference the similarity. As a result of applying an additive approach to the lower 0 GB–8 GB range, and applying a subtractive approach in the upper 8 GB+range, it can be seen that only five MTRRS are used to sufficiently define the entire cacheable memory space, thereby facilitating maximum (i.e., complete) cacheable definition and performance of the system.

In the mixed technique approach, once physical memory is conceptually sub-divided into differing regions which will have differing cache defining techniques applied thereto, the differing regions can then be attempted to be cache defined sequentially, or in parallel. Parallel treatment might be advantageous in that a time it takes to define cacheable memory may be lessened.

It should be noted at this point that, if the memory space had not been treated in lower and upper regions, but instead were treated as a single range with the subtractive approach being globally applied, then cacheable memory space could have been defined using even a lesser number of MTRRS, i.e., four MTRRS, with a second MTRR being used to define a 16 GB block which would replace the 900S blocks 900S-2 and 900S-3. Such might be advantageous in that the additional unused MTRR perhaps could be used for other purposes during system operation.

Figure 10A:
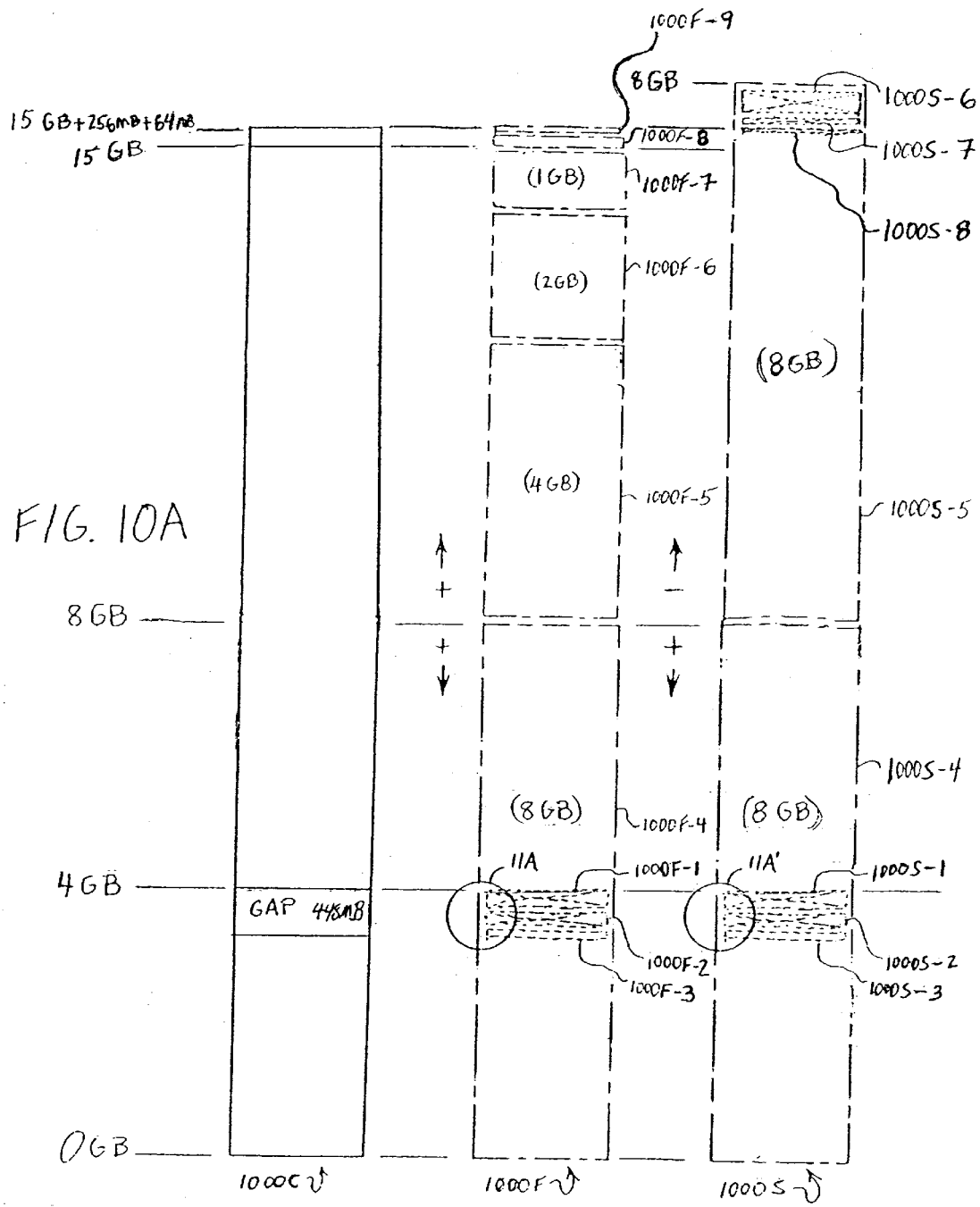
FIGS. 10A and 10B show an example block diagram of another example cacheable memory block useful in explanation of the invention, as well as additional block diagrams showing definition treatment of the memory block.

In addition to all of the above, memory hole adjustment is yet another additional method which may be useful in defining maximum cacheable memory space. More particularly, FIGS. 10A, 10B, 11A and 11B will be used to provide explanation. In starting such explanation, a left-hand portion of FIG. 10A illustrates an example 15 GB+256 MB+64 MB block 1000C of physical memory space having a 448 MB memory hole or gap therein. In starting discussion of this concept, a center portion 1000F of FIG. 10A illustrates an additive approach being applied to both the lower 0 GB–8 GB and upper 8 GB+memory spaces. Of particular interest is the memory gap, wherein an encircled region 11A is shown in greater detail in FIG. 11A.

Figure 11A:
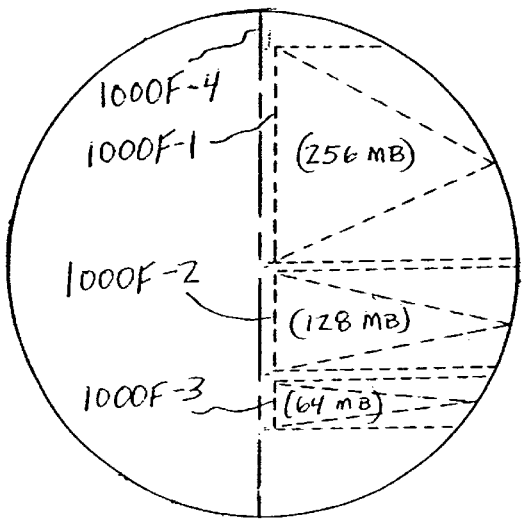
FIGS. 11A and 11B each show a magnified view of a portion of FIGS. 10A and 10B, respectively.
Figure 11B:
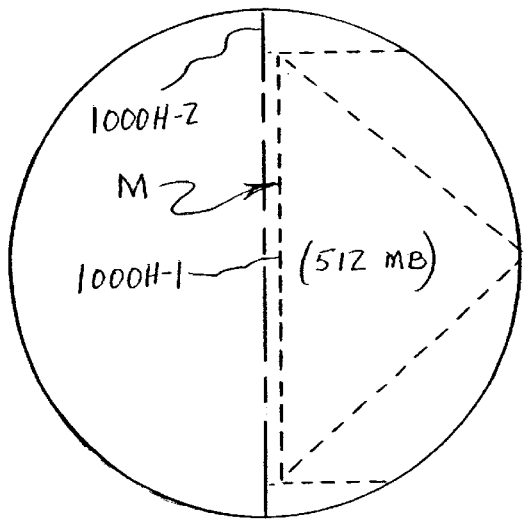

More specifically, FIG. 11A illustrates that a first MTRR is used to define a 256 MB memory hole as illustrated by the short-dashed-line block 1000F-1, a second MTRR is used to define a 128 MB memory hole as illustrated by the short-dashed-line block 1000F-2, and a third MTRR is used to define a 64 MB memory hole, as illustrated by the short-dashed-line block 1000F-3, to result in the example 448 MB memory hole. Thus, it can be seen that three MTRRS (1000F-1, 1000F-2 and 1000F-3) are already used up to define the memory hole. If an additive approach is utilized to attempt to define the rest of the physical memory space, the illustration of FIG. 10A's center portion 1000F shows that nine MTRRS would be required. However, because in this example situation, we are limited to use of six MTRRS, cacheable memory space would be defined only up to the 1000F-6 block, whereby blocks 1000F-7, 1000F-8 and 1000F-9 would remain undefined and uncacheable, thereby degrading performance of the system.

A right-hand portion 1000S of FIG. 10A illustrates an attempt (with the same treatment of the memory hole) to apply an additive approach to the lower memory portion and a subtractive approach to the upper memory portion. Again, three MTRRS are necessary to define the memory hole, such being designated by the encircled area 11A' to indicate that the memory hole definition is the same as was illustrated within 11A. While use of the additive and subtractive approaches within the differing areas would initially appear to show some improvement over the additive/additive approach, i.e., eight required MTRRS instead of nine, it is noted that the additive/subtractive approach may actually be unusable, or if used, result in system corruption.

More particularly, it is noted that, while a fifth MTRR would be used to define the 8 GB–16 GB memory block 1000S-5, and then a sixth (and final available) MTRR would be used to define a –512 MB memory block 1000S-6, there would be no additional MTRRS to define the uncacheable –128 MB memory block 1000S-7 or the –64 MB memory block 1000S-8. Because the system would then erroneously believe that the blocks 1000S-7 and 1000S-8 were valid cacheable memory space, the system may very likely cache memory within such areas which might very well then be overwritten by subsequent system operations, thereby resulting in system corruption.

For alternatively applying a subtractive approach to the entire physical memory 1000C, there would be some improvement over FIG. 10A's right-hand portion 1000S in that only seven MTRRS would be required instead of eight, but such attempt would again fail and result in system corruption for the same reason set forth above with respect to the right-hand portion 1000S. Accordingly, from the above discussions and FIG. 10A illustrations, it can be seen that none of the aforementioned additive, subtractive, or additive/subtractive approaches would be efficient to completely define the example memory space 1000C having the 448 MB memory hole therein.

Thus, discussion turns to a memory hole adjustment or modification embodiment of the present invention. More particularly, attention is directed to FIGS. 10B and 11B. Again for background and comparison purposes, remember that FIG. 11A illustrates the prior three MTRRS 1000F-1, 1000F-2 and 1000F-3 used to define the 448 MB (i.e., non-adjusted or non-modified) memory hole. In contrast, with the present memory hole modification approach, a memory hole size is adjusted upwards, e.g., to a next binary-incremental block size (i.e., in this example, 512 MB). Such example modified M memory hole is illustrated within encircled area 11B and shown in greater detail in FIG. 11B for ease in comparison to the prior FIG. 11A. Using this approach, note that only one MTRR 1000H-1, as opposed to three MTRRS, is needed to define the memory hole. Thus, as illustrated within FIG. 10B, by applying an additive approach to the lower 0 GB–8 GB memory space, a memory hole modification approach to the memory hole, and a subtractive approach to the upper 8 GB+memory space (i.e., by applying a mixed technique), only six MTRRS are required such that the entire physical memory space can be defined as cacheable. While there is a penalty cost in that 64 MB of memory is wasted within the modified memory hole M, an advantage is obtained in that a substantially greater amount of memory space at the upper end of physical memory is recaptured as cacheable. Thus, it can be seen that the memory hole modification approach may provide advantages in some situations.

Figure 10B:
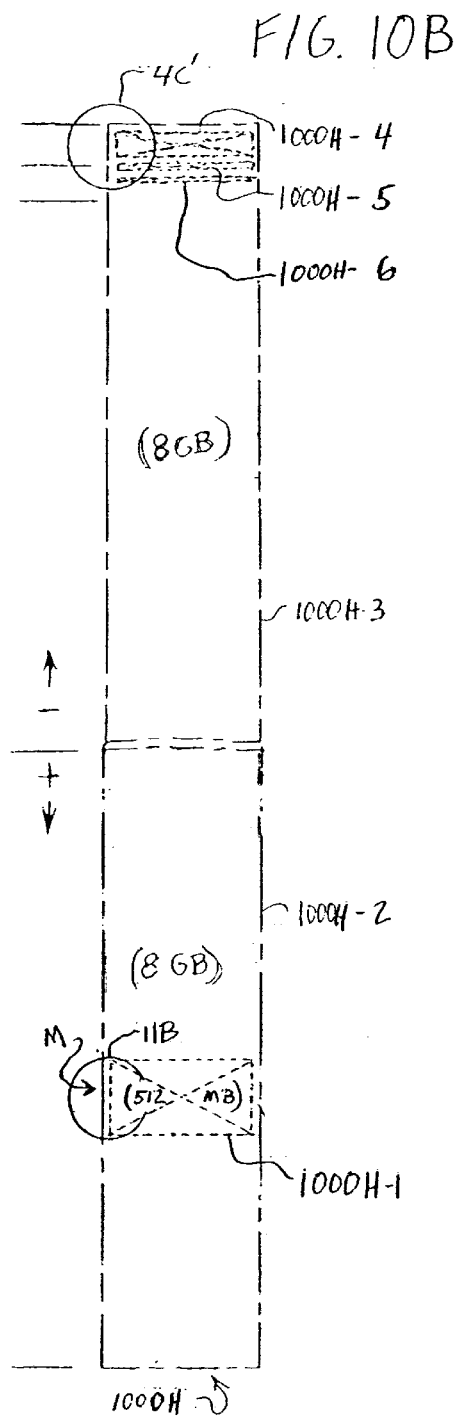

At this point, it should again be noted that, if a subtractive approach is again applied to the entirety of FIG. 10B instead of lower/upper sub-dividing and a mixed technique additive/subtractive approach, the MTRRS could be further reduced to five MTRRS, again resulting in the advantage in that perhaps the unused MTRR could be used for other system operations.

Figure 12:
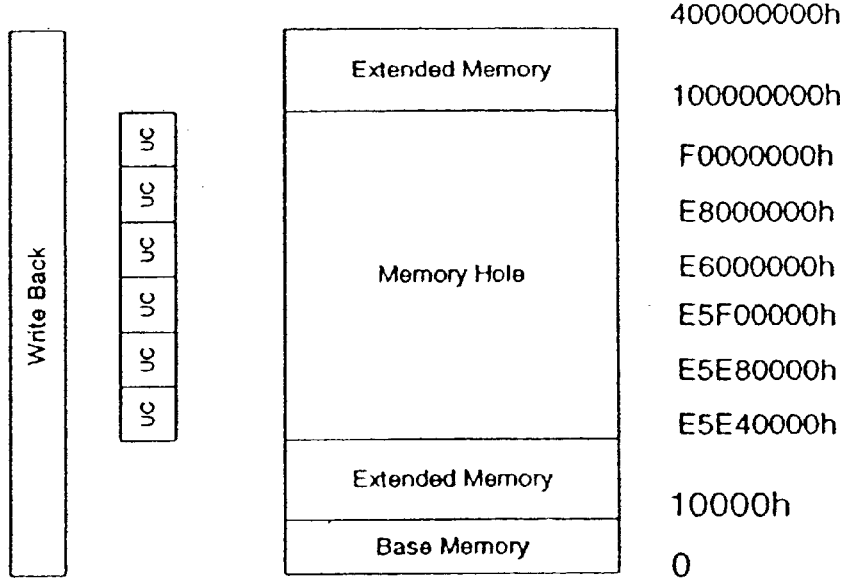
FIG. 12 is a differing type of example before memory hole adjustment.
Figure 13:
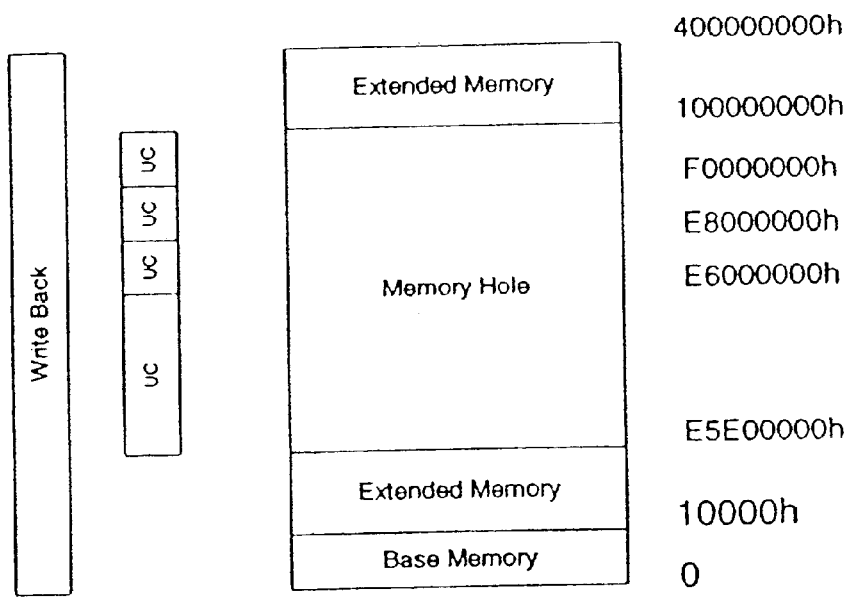
FIG. 13 is a differing type of example after memory hole adjustment.

Two additional memory hole adjustment examples will be illustrated and described in a differing way, to add further clarity to an understanding of the invention. More particularly, FIG. 12 shows how a system with 16 GB of memory installed and a requested memory hole size of 417.75 MB would be alternatively represented. The system memory map is shown on the right and the MTRR mapping on the left. Note that this configuration would utilize seven MTRRS to fully describe the memory hole (the memory hole is not shown to scale). The algorithm would modify the memory hole size by increasing the size by 256 KB so that the new hole would be 418 MB. This would result in the map shown in FIG. 13 using only five MTRRS. In this configuration, there would be 256 KB "missing" that would have been accessible under the old method using seven MTRRS. However, if the method illustrated in FIG. 12 was limited to six MTRRS, the current method would fail to describe the write back region from 0 GB–16 GB since the memory holes are described first followed by the cacheable regions of memory.

The concept behind this is to set up the top of memory (TOM) register and the memory hole base address in such a way that the standard Phoenix MTRR allocation routine will successfully set up no more than six total MTRRS. In pseudo-code, this what it is doing.

```
IF (TOM ≦ 4GB)
    IF (TOM <= Memory Hole)
        Change TOM = Memory Hole and write to TOM register.
    ELSE write TOM register
ELSE            //TOM > 4GB
    //This determines the number of MTRRs to describe WB memory.
    Count number of MTRRs with default config
    Determine the number of MTRRs to describe holes
MTRRCount:
    IF (MTRRs required > 6)
        Add minimum modulo 2 number to the current hole size.
        Redetermine the number of MTRRs to describe holes.
        GOTO MTRRCount label.
    Write new Memory Hole base address.
```

This method will insure that no more than six MTRRS will be utilized. However, if the default configuration requires more than six MTRRS be used, the changes to the memory hole base address will result in the OS "missing" some memory. This algorithm minimizes the amount that is lost.

Accordingly, the present example embodiment adjusts the alignment of the memory hole such that the existing MTRR algorithm will properly describe the system memory in six or less MTRRS. The algorithm works by first determining if the amount of memory that needs to be described will fit in six MTRRS using the conventional algorithm. This is done by counting the number of 1s (in binary) in the top of memory (TOM) register in the chipset. It then counts the number of 1s in memory hole size that was previously set up by the BIOS. If the sum of these two values are less than or equal to six, the registers are left unmodified. If the sum is greater than six, the algorithm will determine the lowest set.(i.e., =1 b) bit in the memory hole size. It will then add to the memory hole size a number that is only this same bit set. This will cause some carries to occur and should reduce the number of 1s in the memory hole size. The algorithm then counts again the number of 1s. If this new number plus the original number of 1s in the TOM register is still greater than six, the last step repeats until this condition is true. Then, the new memory hole size is passed to the standard MTRR routine.

In applying the memory hole modification method or technique, an example embodiment may make several attempts at memory hole modification by adjusting the original memory hole with several differing modification sizes. Some of the modification sizes may be advantageous over others in terms of resulting in a fewer number of MTRRS.

Discussion now turns to FIGS. 6–8 for further examples algorithms applicable with embodiments of the present invention. Instead of running the second or differing type of cache set-up algorithm (e.g., subtractive, memory hold modification, mixed technique) only if a first type of cache set-up algorithm is not able to define the entire cacheable memory within predetermined limits, embodiments of the present invention can be practiced where all alternative types of cache set-up algorithms are run and compared according to a predetermined selection. More particularly, attention is directed to FIG. 6 which generically illustrates such arrangement in block-diagram flow form as flow 600. After Start, in block 602 a first type of cache set-up algorithm is run, in block 604 a second type of cache set-up algorithm is run, and so on as indicated by reference numeral 610. One or more of these set-up algorithms may attempt to apply memory hole modification technique, a mixed technique, and perhaps multiple attempts for several different sized lower/upper memory sub-divisions. In block 606, the set-up results from the different types are compared, and a set-up to be used is selected according to a predetermined selection. For example, a set-up which resulted in a least amount of MTRRS being used might be selected; note that this would be particularly advantageous in systems where all unused (i.e., leftover) MTRRS could be used by the system for other purposes. If multiple set-up algorithms result in a same minimum number of MTRRS being used, some set-up algorithms might be preferred according to a predetermined hierarchy scheme.

Continuing discussion, as mentioned previously, BIOS code is typically an intertwined monolithic code. Often, even the smallest change in operation of one part of BIOS may affect the way other parts of BIOS operate. Accordingly, there may be times when it is desired that a definite algorithm (e.g., a historical or long existing cache set-up algorithm) be used for cache set-up, for example, a program may have been written to assume that cache set-up was made using the definite algorithm. More particularly, attention is directed to FIG. 7, which generically illustrates a suitable arrangement in block-diagram flow form as flow 700. After Start, in block 702 it is checked whether or not an indication (e.g., activation of predetermined key(s)) has been given (e.g., during system initialization) to indicate that a predetermined default cache set-up algorithm should be used. If yes, a default cache set-up algorithm is run (block 704). If no, any or all of a multi-pass multi-type or mixed technique cache set-up arrangement is run (block 706).

FIG. 8 illustrates another alternative, i.e., generically illustrates a suitable arrangement in block-diagram flow form as flow 800. After Start, in block 802 a default cache set-up algorithm is run, and in block 804 the default cache set-up is applied in the system. In block 806, it is checked whether or not an indication (e.g., activation of predetermined key(s)) has been given (e.g., by manual input by a user upon noticing sluggish performance) to indicate that a multi-pass multi-type or mixed technique cache set-up arrangement should be run to determine a new cache set-up. If no, the default cache set-up is continued to be run (block 804). If yes, a multi-pass multi-type or mixed technique cache set-up arrangement is run (block 808), and a new or revised cache set-up is applied in the system.

While BIOS has been historically written as a monolithic block of intertwined code, embodiments of the present invention may break from such pattern, an entirety of the cache set-up arrangement, or individual types of cache set-up algorithms, can be written as a separate, independent (i.e., separately loadable/executable) utility or file. That is, an independent utility or file as a self-contained image that performs a cache set-up task or function. Use of a separate, independent utility or file avoids confusing code intertwining, making the individual function more easily handled, implemented and understood by programmers. Still further, by using an independent utility or file system, individual utilities or files can be selectively run/deactivated or loaded/unloaded at will, i.e., each utility or file is independently loadable/executable.

Recently, the ROM 10 is often replaced by a FLASH memory. More specifically, FLASH is a type of EEPROM (electrically erasable programmable read-only memory) chip that can be erased and reprogrammed directly in the system without using ultraviolet light and an EPROM programmer device. Using FLASH ROM enables a manufacturer to send out ROM upgrades on disk or internet downloads; such upgrades can then be loaded into the FLASH ROM chip on the motherboard without removing and replacing the chip. This method saves time and money for both the system manufacturer and the end user, and adds advantageous/attractive versatility. As further alternatives, BIOS contents may instead be provided in any other non-volatile memory, e.g., on a hard-drive (not shown) or within a firmware (FM) memory 80 (FIG. 1) integrated within a processor module, such as for PU1 28.

While some of the foregoing example embodiments describe a first pass or first type of algorithm and a second pass or second type of algorithm, again, practice of the present invention is not limited to use with just two types of passes or algorithms, e.g., the present invention can be embodied having a library of possible algorithms which may be mixed-and-matched to be applied in numerous differing mixed technologies which can be alternatively checked so as to attempt to maximize cacheable memory space definition.

It should be noted that while this disclosure primarily describes a method to optimize MTRR usage, it also describes three smaller, yet important, "sub-algorithms" for determining the number of MTRRS required to describe a specific memory range. MTRRS can only describe regions of memory in "powers of two" (i.e. 1 MB, 2 MB, 4 MB, 1 GB, 2 GB, not 1.5 GB, 3 MB, etc.). Therefore, determining the number of MTRRS required to correctly describe a region of memory is not straightforward but is crucial to the success of any MTRR usage optimization algorithm. When reviewing the following three algorithms, keep in mind that MTRRS describe the caching characteristics of regions of memory. Again, as should now be apparent from the foregoing teachings, the attributes of a specific MTRR can be modified in such a way as to conceptually provide a "+" operation or a "−" operation. For example, a 15 MB region may be described with four "+" MTRRS (1 MB+2 MB+4 MB+8 MB) or with one "+" MTRR and one "−" MTRR (+16 MB−1 MB).

Method 1: "MTRR Requirements by 'Counting Ones'." This algorithm simply counts the number of bits set in the binary representation of the size of the memory region to be described. Each bit that is set requires one MTRR to describe. For example, a memory region of size 1111000000000000000 b (15 MB) which has four bits set, requires four MTRRS to describe (1 MB+2 MB+4 MB+8 MB). This approach will render the minimum number of MTRRS required to describe a region of memory if only the "+" operator is allowed. Some operating systems may not function correctly with both "+" and "−" MTRR operations, therefore, it may be desirable to implement an algorithm with "+" only MTRR usage.

Method 2: "MTRR Requirements by 'Limited Negation Counting Ones'." This algorithm simply counts the number of bits set in the "limited negation" of the size of the memory region to be described. The "limited negated" size is found by negating the actual size and then masking all the high order bits "above" the most significant bit set in the original size. For example, the "limited negation" of the value 00000101101101101 b is XXXXX010010010010 b. Each set bit in the "limited negation" quantity requires one "−" MTRR to describe. In addition, one more "+" MTRR will be required to correctly describe the memory region (its size will be equivalent to 2× the value of the most significant set bit in the original size). For example, a memory region of size 00000101101101101 b (2925) will require six MTRRS. The "limited inversion" is XXXXX010010010011 b, which has 5 bits set+one additional MTRR (+4096−1−2−16−128−1024). In comparison, using Method 1 would result in eight required MTRRS, and using Method 3 would result in nine MTRRS. This approach may render the minimum number of MTRRS required to describe a region of memory if both the "+" and "−" operators are allowed.

Method 3: "MTRR Requirements by 'Counting Transitions'." This algorithm counts the number of transitions from '1' to '0' (as scanned from LSB to MSB) in the size of the memory region being described. Each transition requires two MTRRS (one "+" MTRR and one "−" MTRR). This algorithm may result in fewer required MTRRS than the "Counting Ones" method. For example, a memory region of size 1111000000000000000 b (15 MB) which has one transition between '1' and '0' requires two MTRRS to describe (16 MB−1 MB). This approach may render the minimum number of MTRRS required to describe a region of memory if both the "+" and "−" operators are allowed. Method 3 becomes more efficient for quantities with consecutive 1 s or 0 s. However, Method 3 may be combined with either Method 1 or Method 2 for a truly optimal algorithm.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

For example, while the above example embodiments generally have been described as running the various cache-defining algorithms substantially sequentially in multi-passes, (e.g., first the bottom-up approach and then the top-down approach), practice of the invention is not limited thereto, i.e., practice of the invention may be made by running the various cache-defining algorithms substantially in parallel, or any combination of sequential and parallel. In addition, the present invention may be implemented with any type of C-language, or any other programming language may be used.

What is claimed is:

1. A cache defining arrangement comprising an arrangement having at least one of a memory hole modification scheme, and a mixed technique scheme where differing non-memory-hole portions of cacheable memory space is defined with at least two mutually different defining techniques, comprising the mixed technique scheme to use a bottom-up scheme to define a first non-memory-hole portion of cacheable memory space, and to use a top-down scheme to define a second non-memory-hole portion, wherein in the bottom-up scheme, mainly substantially additive blocks of cacheable memory space are defined so as to cumulatively define the first non-memory-hole portion, and wherein in the top-down scheme, an oversized block of cacheable memory space is defined, and then mainly substantially subtractive blocks of cacheable memory space are subtracted so as to subtractively define the second non-memory-hole portion.

2. A cache defining arrangement as claimed in claim 1, comprising the memory hole modification scheme, where an initially projected memory hole size is modified to a different size for defining cacheable memory space.

3. A cache defining arrangement as claimed in claim 2, wherein the memory hole modification scheme increases the initially projected memory hole size in predetermined binary increments to modify to a different size for defining cacheable memory space.

4. A cache defining arrangement comprising an arrangement having both of a memory hole modification scheme, and a mixed technique scheme where differing non-memory-hole portions of cacheable memory space is defined with at least two mutually different defining techniques, wherein the mixed technique scheme is to use a bottom-up scheme to define a first non-memory-hole portion of cacheable memory space, and to use a top-down scheme to define a second non-memory-hole portion, wherein in the bottom-up scheme, mainly substantially additive blocks of cacheable memory space are defined so as to cumulatively define the first non-memory-hole portion, and wherein in the top-down scheme, an oversized block of cacheable memory space is defined, and then mainly substantially subtractive blocks of cacheable memory space are subtracted so as to subtractively define the second non-memory-hole portion.

5. A cache defining arrangement as claimed in claim 4, wherein in the memory hole modification scheme, an initially projected memory hole size is modified to a different size for defining cacheable memory space.

6. A cache defining arrangement as claimed in claim 5, wherein the memory hole modification scheme increases the initially projected memory hole size in predetermined binary increments to modify to a different size for defining cacheable memory space.

7. A cache defining arrangement as claimed in claim 4, wherein the cache defining arrangement is adapted to run each of the memory hole modification scheme and the mixed technique scheme, sequentially one after another.

8. A cache defining arrangement as claimed in claim 4, wherein the mixed technique scheme is adapted to run cacheable memory space defining procedures for the differing non-memory-hole portions of cacheable memory space, at least partially in parallel with one another.

9. A cache defining arrangement as claimed in claim 4, wherein the cache defining arrangement comprises a predetermined selection algorithm to select which result from the memory hole modification scheme and the mixed technique scheme should be used for defining the cacheable memory space.

10. A cache defining arrangement as claimed in claim 4, wherein the mixed technique scheme is adapted to run at least two mutually different cache defining schemes for each non-memory-hole portion of cacheable memory space, and to select which result from the at least two mutually different cache defining schemes should be used for defining the cacheable memory space.

11. A cache defining arrangement as claimed in claim 4, wherein the mixed technique scheme is adapted to separately run for a plurality of different size combinations of the non-memory-hole portions of cacheable memory space, and to select which result size combination of the non-memory hole portions should be used for defining the cacheable memory space.

12. A cache defining arrangement as claimed in claim 4, wherein the cache defining arrangement is adapted to run a default scheme for defining the cacheable memory space to determine whether the cacheable memory space can be defined within predetermined resources, and if not, the cache defining arrangement is adapted to run at least one of the memory hole modification scheme and the mixed technique scheme for defining the cacheable memory space.

13. A cache defining arrangement as claimed in claim 4, comprising a selection arrangement adapted to allow selection to run only a predetermined default scheme for defining the cacheable memory space.

14. A system comprising a cache defining arrangement comprising an arrangement having at least one of a memory hole modification scheme, and a mixed technique scheme where differing non-memory-hole portions of cacheable memory space is defined with at least two mutually different defining techniques, comprising the mixed technique scheme to use a bottom-up scheme to define a first non-memory-hole portion of cacheable memory space, and to use a top-down scheme to define a second non-memory-hole portion, wherein in the bottom-up scheme, mainly substantially additive blocks of cacheable memory space are defined so as to cumulatively define the first non-memory-hole portion, and wherein in the top-down scheme, an oversized block of cacheable memory space is defined, and then mainly substantially subtractive blocks of cacheable memory space are subtracted so as to subtractively define the second non-memory-hole portion.

15. A system as claimed in claim 14, comprising the memory hole modification scheme, where an initially projected memory hole size is modified to a different size for defining cacheable memory space.

16. A system as claimed in claim 15, wherein the memory hole modification scheme increases the initially projected memory hole size in predetermined binary increments to modify to a different size for defining cacheable memory space.

17. A system comprising a cache defining arrangement comprising an arrangement having both of a memory hole modification scheme, and a mixed technique scheme where differing non-memory-hole portions of cacheable memory space is defined with at least two mutually different defining techniques, wherein the mixed technique scheme is to use a bottom-up scheme to define a first non-memory-hole portion of cacheable memory space, and to use a top-down scheme to define a second non-memory-hole portion, wherein in the bottom-up scheme, mainly substantially additive blocks of cacheable memory space are defined so as to cumulatively define the first non-memory-hole portion, and wherein in the top-down scheme, an oversized block of cacheable memory space is defined, and then mainly substantially subtractive blocks of cacheable memory space are subtracted so as to subtractively define the second non-memory-hole portion.

18. A system as claimed in claim 17, wherein in the memory hole modification scheme, an initially projected memory hole size is modified to a different size for defining cacheable memory space.

19. A system as claimed in claim 18, wherein the memory hole modification scheme increases the initially projected memory hole size in predetermined binary increments to modify to a different size for defining cacheable memory space.

20. A system as claimed in claim 18, wherein the cache defining arrangement is adapted to run each of the memory hole modification scheme and the mixed technique scheme, sequentially one after another.

21. A system as claimed in claim 18, wherein the mixed technique scheme is adapted to run cacheable memory space defining procedures for the differing non-memory-hole portions of cacheable memory space, at least partially in parallel with one another.

22. A system as claimed in claim 18, wherein the cache defining arrangement comprises a predetermined selection algorithm to select which result from the memory hole modification scheme and the mixed technique scheme should be used for defining the cacheable memory space.

23. A system as claimed in claim 18, wherein the mixed technique scheme is adapted to run at least two different cache defining schemes for each non-memory-hole portion of cacheable memory space, and to select which result from the at least two mutually different cache defining schemes should be used for defining the cacheable memory space.

24. A system as claimed in claim 18, wherein the mixed technique scheme is adapted to separately run for a plurality of different size combinations of the non-memory-hole portions of cacheable memory space, and to select which result size combination of the non-memory hole portions should be used for defining the cacheable memory space.

25. A system as claimed in claim 18, wherein the cache defining arrangement is adapted to run a default scheme for defining the cacheable memory space to determine whether the cacheable memory space can be defined within predetermined resources, and if not, the cache defining arrangement is adapted to run at least one of the memory hole modification scheme and the mixed technique scheme for defining the cacheable memory space.

26. A system as claimed in claim 18, comprising a selection arrangement adapted to allow selection to run only a predetermined default scheme for defining the cacheable memory space.

27. A cache defining method comprising;
    defining cacheable memory space using at least one of a memory hole modification scheme, and a mixed technique scheme where differing non-memory-hole portions of the cacheable memory space is defined with at least two mutually different defining techniques; and
    applying the mixed technique scheme to use a bottom-up scheme to define a first non-memory-hole portion of cacheable memory space, and to use a top-down scheme to define a second non-memory-hole portion, wherein in the bottom-up scheme, mainly substantially additive blocks of cacheable memory space are defined so as to cumulatively define the first non-memory-hole portion, and wherein in the top-down scheme, an oversized block of cacheable memory space is defined, and then mainly substantially subtractive blocks of cacheable memory space are subtracted so as to subtractively define the second non-memory-hole portion.

28. A cache defining method as claimed in claim 27, comprising:
    applying the memory hole modification scheme, where an initially projected memory hole size is modified to a different size for defining cacheable memory space.

29. A cache defining method as claimed in claim 28, wherein the memory hole modification scheme increases the initially projected memory hole size in predetermined binary increments to modify to a different size for defining cacheable memory space.

30. A cache defining method comprising;
    defining cacheable memory space using both of a memory hole modification scheme, and a mixed technique scheme where differing non-memory-hole portions of the cacheable memory space is defined with at least two mutually different defining techniques, wherein the mixed technique scheme uses a bottom-up scheme to define a first non-memory-hole portion of cacheable memory space, and uses a top-down scheme to define a second non-memory-hole portion, wherein in the bottom-up scheme, mainly substantially additive blocks of cacheable memory space are defined so as to cumulatively define the first non-memory-hole portion, and wherein in the top-down scheme, an oversized block of cacheable memory space is defined, and then mainly substantially subtractive blocks of cacheable memory space are subtracted so as to subtractively define the second non-memory-hole portion.

31. A cache defining method as claimed in claim 30, wherein in the memory hole modification scheme, an initially projected memory hole size is modified to a different size for defining cacheable memory space.

32. A cache defining method as claimed in claim 31, wherein the memory hole modification scheme increases the initially projected memory hole size in predetermined binary increments to modify to a different size for defining cacheable memory space.

33. A cache defining method as claimed in claim 30, comprising:
running each of the memory hole modification scheme and the mixed technique scheme, sequentially one after another.

34. A cache defining method as claimed in claim 30, comprising:
running cacheable memory space defining procedures for the differing non-memory-hole portions of cacheable memory space, at least partially in parallel with one another.

35. A cache defining method as claimed in claim 30, comprising:
running a predetermined selection algorithm to select which result from the memory hole modification scheme and the mixed technique scheme should be used for defining the cacheable memory space.

36. A cache defining method as claimed in claim 30, wherein the mixed technique scheme running at least two mutually different cache defining schemes for each non-memory-hole portion of cacheable memory space, and selecting which result from the at least two mutually different cache defining schemes should be used for defining the cacheable memory space.

37. A cache defining method as claimed in claim 30, wherein the mixed technique scheme being separately run for a plurality of different size combinations of the non-memory-hole portions of cacheable memory space, and to select which result size combination of the non-memory hole portions should be used for defining the cacheable memory space.

38. A cache defining method as claimed in claim 30, comprising:
first running a default scheme for defining the cacheable memory space to determine whether the cacheable memory space can be defined within predetermined resources, and if not, then running at least one of the memory hole modification scheme and the mixed technique scheme for defining the cacheable memory space.

39. A cache defining method as claimed in claim 30, comprising:
running a selection arrangement adapted to allow selection to run only a predetermined default scheme for defining the cacheable memory space.

40. A cache defining program embodied on a computer-readable medium, comprising an arrangement capable of running at least one of a memory hole modification scheme, and a mixed technique scheme where differing non-memory-hole portions of cacheable memory space is defined with at least two mutually different defining techniques, wherein the mixed technique scheme uses a bottom-up scheme to define a first non-memory-hole portion of cacheable memory space, and uses a top-down scheme to define a second non-memory-hole portion, wherein in the bottom-up scheme, mainly substantially additive blocks of cacheable memory space are defined so as to cumulatively define the first non-memory-hole portion, and wherein in the top-down scheme, an oversized block of cacheable memory space is defined, and then mainly substantially subtractive blocks of cacheable memory space are subtracted so as to subtractively define the second non-memory-hole portion.

41. A cache defining program as claimed in claim 40, comprising:
applying the memory hole modification scheme, where an initially projected memory hole size is modified to a different size for defining cacheable memory space.

42. A cache defining program embodied on a computer-readable medium, comprising an arrangement capable of running both of a memory hole modification scheme, and a mixed technique scheme where differing non-memory-hole portions of cacheable memory space is defined with at least two mutually different defining techniques, wherein the mixed technique scheme uses a bottom-up scheme to define a first non-memory-hole portion of cacheable memory space, and uses a top-down scheme to define a second non-memory-hole portion, wherein in the bottom-up scheme, mainly substantially additive blocks of cacheable memory space are defined so as to cumulatively define the first non-memory-hole portion, and wherein in the top-down scheme, an oversized block of cacheable memory space is defined, and then mainly substantially subtractive blocks of cacheable memory space are subtracted so as to subtractively define the second non-memory-hole portion.

43. A cache defining program as claimed in claim 42, wherein in the memory hole modification scheme, an initially projected memory hole size is modified to a different size for defining cacheable memory space.

44. A cache defining program as claimed in claim 42, comprising:
running each of the memory hole modification scheme and the mixed technique scheme, sequentially one after another.

45. A cache defining program as claimed in claim 42, comprising:
running cacheable memory space defining procedures for the differing non-memory-hole portions of cacheable memory space, at least partially in parallel with one another.

* * * * *

UNITED STATES PATENT AND TRADEMARK OFFICE
CERTIFICATE OF CORRECTION

PATENT NO. : 6,694,418 B2
DATED : February 17, 2004
INVENTOR(S) : Schelling et al.

It is certified that error appears in the above-identified patent and that said Letters Patent is hereby corrected as shown below:

Column 5,
Line 2, delete "in puts" and insert -- inputs --.
Line 4, delete "Index 1" and insert -- Index = 1 --.

Column 14,
Line 15, delete "IF (TOM <= Memory Hole)" and insert
-- IF (TOM < Memory Hole) --.

Column 17,
Line 27, delete "1 s or 0 s" and insert -- 1s or 0s --.

Signed and Sealed this

Tenth Day of August, 2004

JON W. DUDAS
*Acting Director of the United States Patent and Trademark Office*